(12) United States Patent
Kanemoto

(10) Patent No.: US 9,141,315 B2
(45) Date of Patent: Sep. 22, 2015

(54) PRINTING SYSTEM UPLOADING JOB STORED ON PRINTER TO SERVER

(71) Applicant: BROTHER KOGYO KABUSHIKI KAISHA, Nagoya, Aichi (JP)

(72) Inventor: Ayako Kanemoto, Nisshin (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/475,898

(22) Filed: Sep. 3, 2014

(65) Prior Publication Data

US 2015/0092219 A1 Apr. 2, 2015

(30) Foreign Application Priority Data

Sep. 30, 2013 (JP) ................................. 2013-203150

(51) Int. Cl.
*G06F 3/12* (2006.01)
*H04N 1/00* (2006.01)

(52) U.S. Cl.
CPC .............. *G06F 3/121* (2013.01); *G06F 3/1234* (2013.01); *H04N 1/00244* (2013.01); *H04N 2201/0093* (2013.01)

(58) Field of Classification Search
USPC ........................................................ 358/1.14
See application file for complete search history.

(56) References Cited

U.S. PATENT DOCUMENTS

| | | | | |
|---|---|---|---|---|
| 2008/0239375 | A1* | 10/2008 | Okajima ...................... | 358/1.15 |
| 2008/0239383 | A1* | 10/2008 | Okajima ...................... | 358/1.15 |
| 2011/0013215 | A1* | 1/2011 | Yonezawa et al. ........... | 358/1.14 |
| 2012/0250080 | A1* | 10/2012 | Ohtake ........................ | 358/1.15 |
| 2013/0335778 | A1 | 12/2013 | Sugiyama | |

FOREIGN PATENT DOCUMENTS

| | | |
|---|---|---|
| JP | H11-203068 A | 7/1999 |
| JP | 2006-295347 A | 10/2006 |
| JP | 2008-283666 A | 11/2008 |
| JP | 2013-257728 A | 12/2013 |

* cited by examiner

*Primary Examiner* — Ngon Nguyen
(74) *Attorney, Agent, or Firm* — Scully, Scott, Murphy & Presser P.C.

(57) ABSTRACT

The present invention provides a server including: a communication unit; a storage unit; and a controlling unit. The communication unit is configured to communicate with a printer. The controlling unit is configured to store a job in association with error data in the storage unit upon receiving the job and the error data from the printer via the communication unit. The error data indicates details of an error that has occurred when the printer is executing the job.

10 Claims, 5 Drawing Sheets

PRINTING SYSTEM UPLOADING JOB STORED ON PRINTER TO SERVER

CROSS REFERENCE TO RELATED APPLICATION

This application claims priority from Japanese Patent Application No. 2013-203150 filed Sep. 30, 2013. The entire content of the priority application is incorporated herein by reference.

TECHNICAL FIELD

The present invention relates to a printing system possessing a printer and a server, and more particularly to a technique for uploading a job stored on the printer to the server when an error occurs on the printer.

BACKGROUND

Conventionally, printing systems possessing a printer and a server have employed a technique such as that described in Japanese Patent Application Publication No. H11-203068 for saving the job being printed on the printer to the server when an error occurs during the printing operation and for subsequently returning the saved job to the printer once the error has been resolved to resume the printing operation.

SUMMARY

However, this conventional technology presents the following problem. Namely, it is preferable to be able to identify the cause of the error for each job saved on the server in order to avoid the same error from recurring upon resuming the printing operation on the saved job.

In view of the foregoing, it is an object of the present invention to provide a technique for resolving the problem inherent in the conventional technology by helping the user identify the cause of the error for each job that was saved on the server due to an error occurring.

In order to attain the above and other objects, the present invention provides a server that may include: a communication unit; a storage unit; and a control unit. The communication unit may be configured to communicate with a printer. The control unit may be configured to store a job in association with error data in the storage unit upon receiving the job and the error data from the printer via the communication unit. The error data may indicate details of an error that has occurred when the printer is executing the job.

According to another aspect, the present invention provides a printer that may include: a communication unit; a printing unit; and a control unit. The communication unit may be configured to communicate with a server. The control unit may be configured to: control the printing unit to execute a job; terminate execution of the job upon detecting an error when the printing unit is executing the job; and upload the job and error data to the server via the communication unit. The error data may indicate details of the error.

According to still another aspect, the present invention provides a printing system that may include: a server; and a printer. The printer may include: a printer communication unit; a printing unit; and a printer control unit. The printer communication unit may be configured to communicate with the server. The printer control unit may be configured to: control the printing unit to execute a job; terminate execution of the job upon detecting an error when the printing unit is executing the job; and upload the job and error data to the server via the printer communication unit. The error data may indicate details of the error. The server may include: a server communication unit; a storage unit; and a server control unit. The server communication unit may be configured to communicate with the printer. The server control unit may be configured to store the job in association with the error data in the storage unit upon receiving the job and the error data from the printer via the server communication unit.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
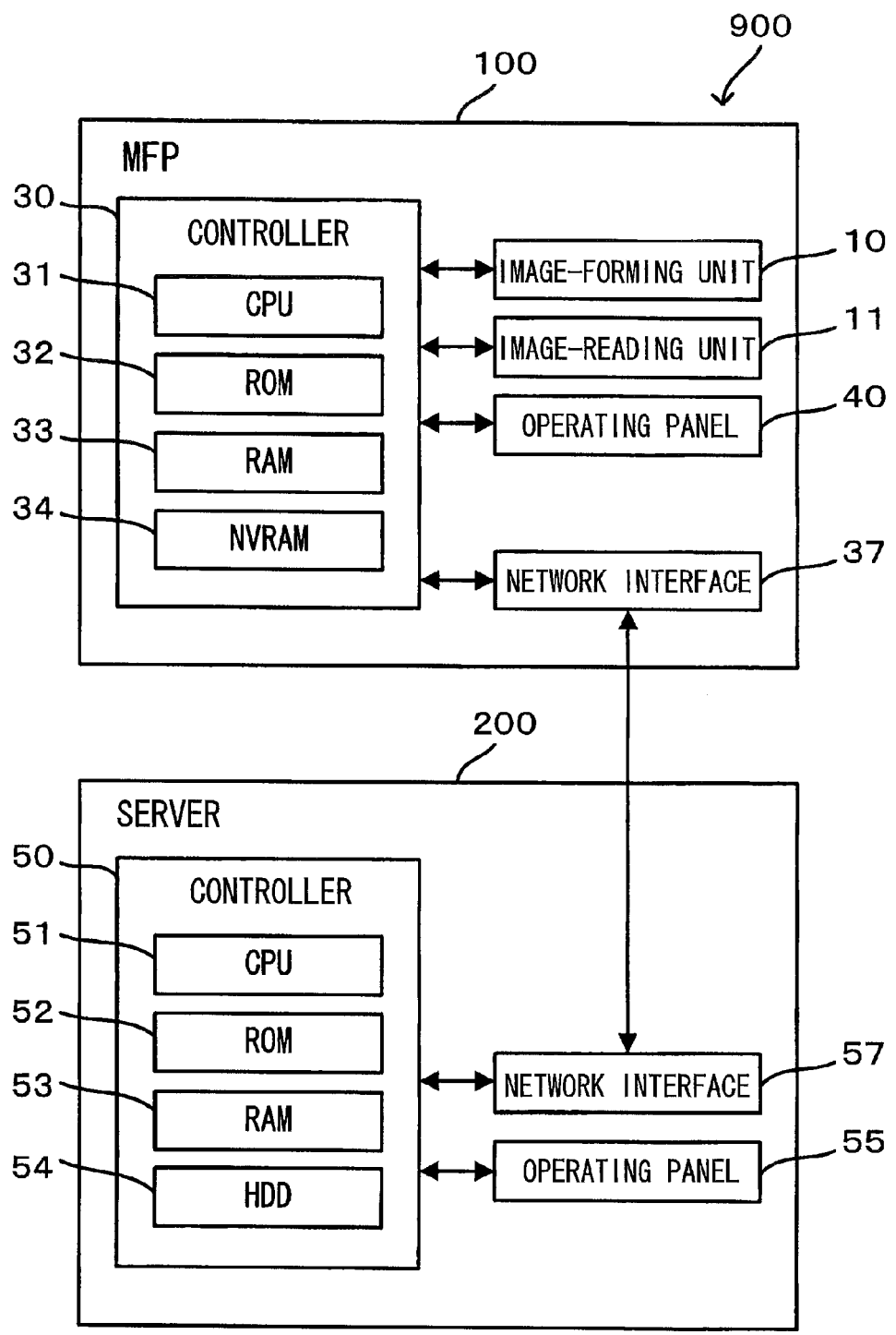
FIG. 1 is a block diagram showing a printing system according to an embodiment of the present invention.

Next, a printing system according to a preferred embodiment of the present invention will be described while referring to the accompanying drawings wherein like parts and components are designated by the same reference numerals to avoid duplicating description. In this embodiment, the present invention is applied to a printing system having a multifunction peripheral (MFP) that possesses a printing function, and a server for saving at least some jobs for which an error has occurred.

[Overall Structure of the Printing System]

FIG. 1 shows a printing system 900 according to the preferred embodiment serving as an example of the printing system of the present invention. The printing system 900 includes an MFP 100 as an example of the printer of the present invention, and a server 200 as an example of the server of the present invention. In the printing system 900 of the preferred embodiment, if an error occurs on the MFP 100 that restricts execution of a print job, the print job whose execution is restricted is uploaded to the server 200. Note that any number of printers in addition to the MFP 100 may be connected to the server 200.

[Structure of the MFP]

Next, the general structure of the MFP 100 will be described. As shown in FIG. 1, the MFP 100 includes a controller 30 possessing a CPU 31, a ROM 32, a RAM 33, and a nonvolatile RAM (NVRAM) 34. The MFP 100 also includes an image-forming unit 10 for printing images on paper, an image-reading unit 11 for reading images from originals, an operating panel 40 for displaying the operating status of the MFP 100 and for accepting input from a user, and a network interface 37 for enabling the MFP 100 to communicate with other devices connected to the MFP 100 via a local area network (LAN) cable. The CPU 31 controls the image-forming unit 10, image-reading unit 11, operating panel 40, and network interface 37. Note that the controller 30 in FIG. 1 having the CPU 31 and the like collectively denotes all hardware used to control the MFP 100 and is not limited to a single piece of hardware in the MFP 100.

The image-forming unit 10 may be capable of performing color printing or only monochrome printing. In this embodiment, the image-forming unit 10 is capable of performing color printing. Further, the image-forming unit 10 may employ an electro-photographic printing system or an inkjet printing system. The image-forming unit 10 is an example of the printing unit of the present invention. Further, the image-reading unit 11 may be capable of performing color scans or only monochrome scans. In this embodiment, the image-reading unit 11 is capable of performing color scans. Further, the image-forming unit 10 may employ a CCD reading mechanism or a CIS reading mechanism.

The ROM 32 stores various settings, initial values, and the like, as well as firmware, which is a control program for controlling the MFP 100. The RAM 33 and NVRAM 34 are used as work areas in which various control programs are loaded, or as storage areas for temporarily storing data.

The CPU 31 controls the various components of the MFP 100 by reading control programs from the ROM 32, executing the control programs while storing process results in the RAM 33 or NVRAM 34 based on the execution of these control programs and signals received from various sensors. The CPU 31 is an example of the control unit of the printer and the printer control unit according to the present invention. Note that the controller 30 may also be considered the control unit of the printer and the printer control unit.

The network interface 37 is hardware for executing communications with devices connected to the MFP 100 via a LAN cable. For example, the MFP 100 can output an upload request to the server 200 via the network interface 37 and can download data in the same manner. The network interface 37 is an example of the communication unit of the printer and the printer communication unit according to the present invention.

The operating panel 40 is provided on the outer case of the MFP 100. The operating panel 40 includes various buttons for receiving user input, and a touchscreen for displaying messages and settings. The buttons may include an OK button through which the user inputs a command to start printing, and a cancel button by which the user inputs a command to cancel printing, for example. The user can also perform input operations by touching the touchscreen. For example, the user may input print settings or select a job to be printed through the touchscreen.

[Structure of the Server]

Next, the overall structure of the server 200 will be described. As shown in FIG. 1, the server 200 includes a controller 50 having a CPU 51, a ROM 52, a RAM 53, and a hard disk drive (HDD) 54. The server 200 also includes an operating panel 55 having a touchscreen that possesses both a display function and an input function, and a network interface 57 that enables the server 200 to communicate with an external device. The CPU 51 controls both the operating panel 55 and the network interface 57. Note that the controller 50 in FIG. 1 having the CPU 51 and the like collectively denotes all hardware used to control the server 200 and is not limited to a single piece of hardware in the server 200.

Software installed on the HDD 54 includes an operating system (OS), a browser for viewing data on the Internet, and a device driver that controls various devices. The HDD 54 also stores print jobs that are uploaded from printers, such as the MFP 100. The HDD 54 is an example of the storage unit according to the present invention.

The CPU 51 reads control programs from the ROM 52 and programs from the HDD 54 and executes these programs to implement various processes while storing computation results in the RAM 53 or HDD 54. The CPU 51 is an example of the control unit of the server and the server control unit according to the present invention, but the controller 50 itself may be considered the control unit of the server and the server control unit.

As with the network interface 57 in the MFP 100 described above, the network interface 57 in the server 200 is hardware that serves to communicate with devices connected to the server 200 via a LAN cable. For example, the server 200 can exchange print jobs with the MFP 100 through the network interface 57. The network interface 57 is an example of the communication unit of the server and the server communication unit according to the present invention.

[Overview of Operations for Handling Errors]

Next, the operations of the printing system 900 performed to handle an error occurring on the MFP 100 while the MFP 100 is executing a print job X will be described with reference to FIG. 2. For this example, it will be assumed that the sheet size set in print job X is A4-size, and an "incorrect paper size" error has occurred in the MFP 100. Further, MFPs 101 and 102 have equivalent functions to those of the MFP 100.

When the "incorrect paper size" error occurs on the MFP 100 while the MFP 100 is printing print job X, the MFP 100 restricts printing of print job X. After the occurrence of the error, the MFP 100 in the printing system 900 of the preferred embodiment first uploads print job X to the server 200 ((1) in FIG. 2). When uploading print job X, the MFP 100 adds error data and transfer data. The error data indicates the details of the error that has occurred, such as the type of error and details about the type of error. The details of the error type may include print settings at the type of the error's occurrence. The transfer data is required for transferring print job X to another printer through the server 200 and may include data indicating whether transfer settings have been provided, data specifying a destination printer for the transfer, and data specifying the transfer time, i.e., the time at which the transfer is to begin.

Figure 2:
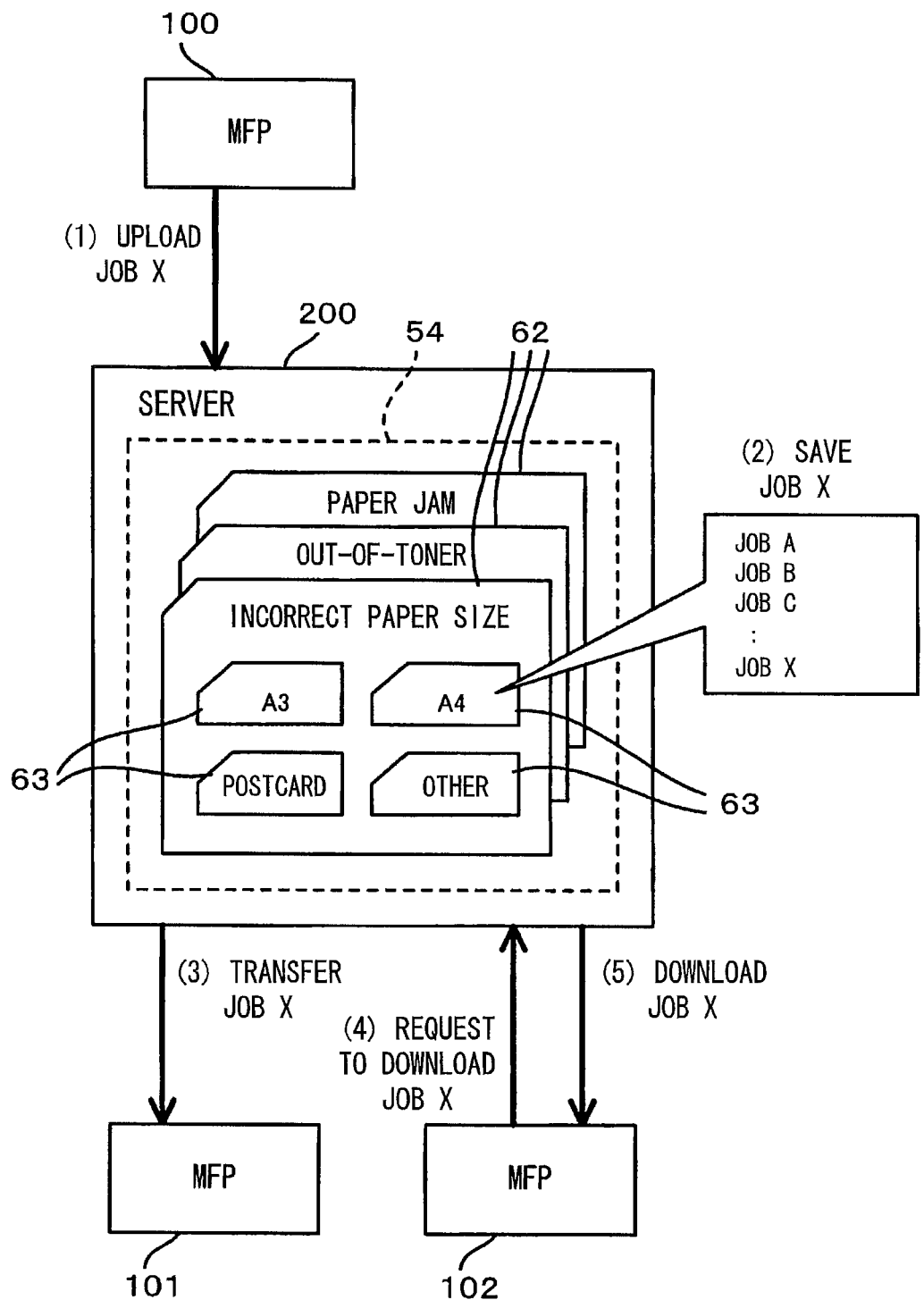
FIG. 2 is an explanatory diagram showing an example of saving uploaded print jobs in a server according to the embodiment.

After print job X has been uploaded onto the server 200, the CPU 51 of the server 200 saves print job X on the HDD 54 at a storage location determined from the details of the error data appended to print job X in order to distinguish print job X from other jobs ((2) in FIG. 2). The server 200 in the preferred embodiment is provided with a folder 62 for each type of error. Each folder 62 further includes folders 63 for other relevant details of each error type as needed. The CPU 51 then stores print job X in the folder matching the error data appended to print job X.

In the example of FIG. 2, the folders 62 provided for error types include folders 62 respectively corresponding to an "incorrect paper size" error, an "out-of-toner" error, and a "paper jam" error. The folder 62 for "incorrect paper size" further includes folders 63 for each paper size that can be set in the print settings. In this example, folders 63 are provided for "A3," "A4," and "postcard" sizes, with an "other" folder 63 provided for all other paper sizes. Alternatively, a folder may be provided for each paper tray. The other folders 62 may include different folders 63 from those described above. For example, the "out-of toner" folder 62 may include a folder 63 for each toner color.

Thus, the CPU 51 of the server 200 searches for the folder that matches the error details based on the error data appended to the print job. When the server 200 receives print job X, for example, the CPU 51 searches for the "incorrect paper size" folder, then searches within that folder for the "A4" folder matching the paper size in the print settings. The CPU 61 then saves print job X in the folder found through this search. If a folder matching the error details is not found, the CPU 51 may generate a new folder and save print job X in this new folder.

Alternatively, the CPU 51 may save print job X in a general-purpose folder, if such a folder exists. By sorting jobs being saved into different folders for each error type, the user can display the saved location of the print job using software or the like for managing folder structures, for example, and can easily infer the details of the error that occurred when executing the print job simply by checking the folder in which the print job is saved.

After print job X is saved on the server 200 in the printing system 900 of the preferred embodiment, the CPU 51 transmits print job X to another printer based on the transfer data appended to print job X. By transmitting print job X to another printer, the printing operation for print job X can be completed on the other printer.

In the preferred embodiment, there are two methods for having print job X printed on another printer. In the first method, the print job received from the MFP 100 includes transfer data. This transfer data includes data indicating another printer to which the print job should be transferred (the MFP 101 in the example of FIG. 2). The server 200 automatically transfers the job to this other printer. The second method is a manual method in which the user of the other printer (the MFP 102 in the example of FIG. 2) controls the printer to output a request to the server 200 in order to download print job X, and the server 200 transmits print job X to the other printer upon receiving the request. In the preferred embodiment, the first method is selected when transfer settings are provided with print job X, and the second method is selected when transfer settings are not provided.

More specifically, in the first method, the server 200 acquires data indicating the destination printer and the transfer time from the transfer data received from the MFP 100 or from transfer data stored in the server 200 itself. After saving print job X, the server 200 transmits print job X to the MFP 101 indicated as the destination printer after the transfer time has elapsed ((3) in FIG. 2). Upon receiving print job X, the MFP 101 prints print job X. By waiting to transfer the print job until the transfer time has elapsed, the server 200 gives the user sufficient time to check the saved location of print job X in the server 200. Hence, the first method can print the job on a desired printer while giving the user time to check details of the error. When the server 200 itself stores transfer data, the MFP 100 may not need to append transfer data to print job X. In the case that the server 200 stores transfer data and transfer data is also appended to print job X, the transfer destination specified in the transfer data appended to print job X takes precedence.

According to the second method, the MFP 102 accesses the server 200 to acquire information on a print job stored on the server 200. The user operates the MFP 102 to select the desired print job X to be downloaded. After the user has selected print job X, the MFP 102 issues a request to the server 200 to download print job X ((4) in FIG. 2). The MFP 102 then downloads print job X from the server 200 and prints print job X ((5) in FIG. 2). According to the second method, the user can select the timing at which print job X stored on the server 200 is printed, and the printer to be used for printing print job X.

[Printing Process on the MFP]

Next, the operations performed on individual devices of the printing system 900 will be described. First, a printing process executed by the MFP 100 will be described with reference to the flowchart in FIG. 3. The CPU 31 of the MFP 100 executes the printing process when a print condition for a print job has been satisfied in the MFP 100. The print condition for a print job may be reception of a print job or input of a password for executing a print job, for example. The same process can be implemented both MFPs 101 and 102.

Figure 3:
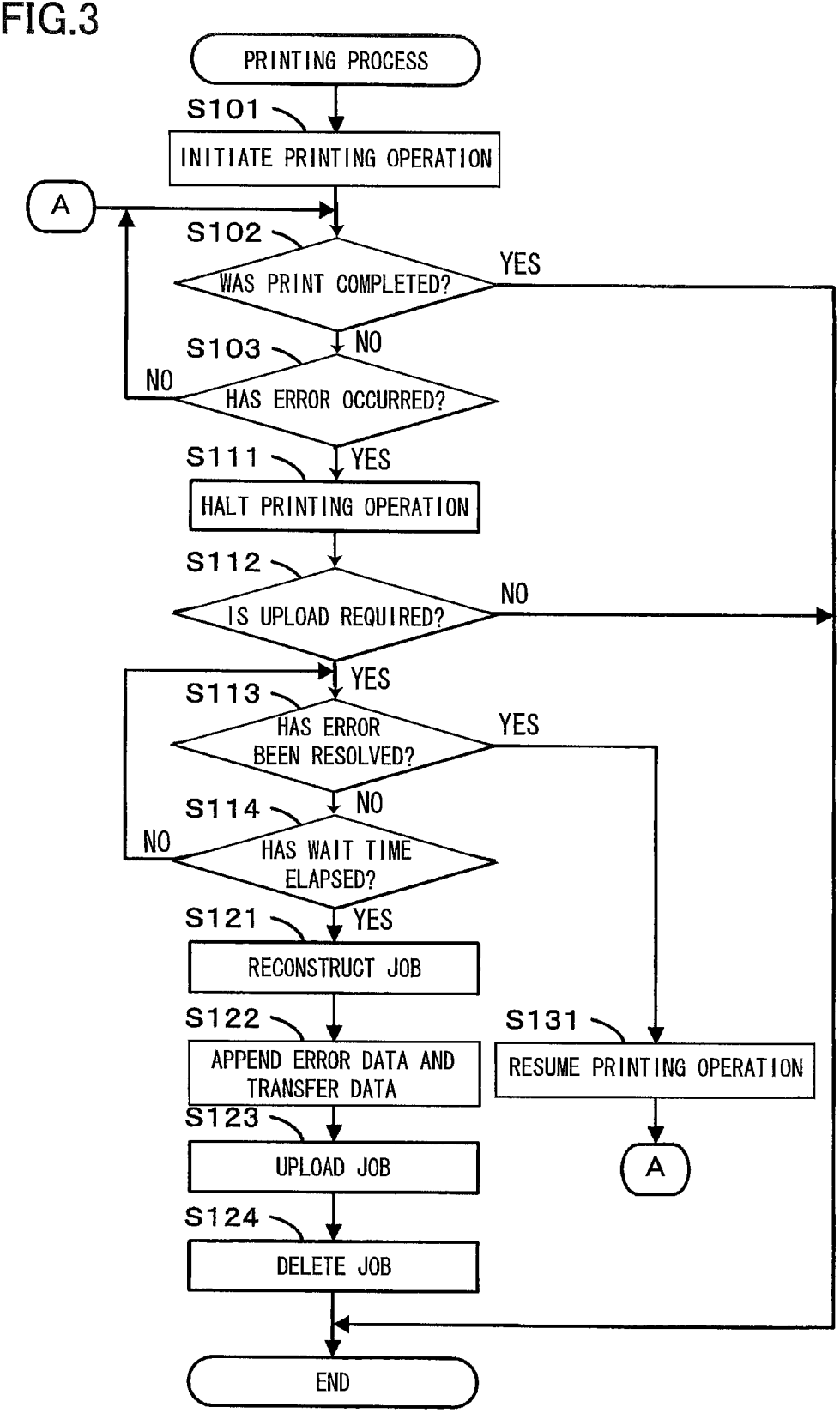
FIG. 3 is a flowchart illustrating steps in a printing process executed by an MFP.

In S101 at the beginning of the printing process in FIG. 3, the CPU 31 initiates a printing operation based on the print job for which the print condition was met. S101 is an example of the execution of the job according to the present invention. In S102 the CPU 31 determines whether the print has been completed. If the print was completed (S102: YES), the CPU 31 ends the current printing process. However, if the print was not completed (S102: NO), in S103 the CPU 31 determines whether an error occurred that has restricted the print. S103 is an example of the detection of the error according to the present invention. If such an error has not occurred (S103: NO), the CPU 31 returns to S102 and repeats the above determinations in S102 and S103.

However, if an error has occurred (S103:YES), in S111 the CPU 31 halts the printing operation. In S112 the CPU 31 determines whether it is necessary to upload the restricted print job to the server 200. The CPU 31 may determine that the print job need not be uploaded to the server 200 if the error is a type that the server 200 cannot distinguish, for example. It is also possible to have the user configure settings in advance specifying particular errors as errors for which an upload is unnecessary. If uploading the print job is unnecessary (S112: NO), the CPU 31 is simply ends the current printing process without uploading the print job to the server 200.

However, if an upload is required (S112:YES), in S113 the CPU 31 determines whether the error was resolved. If the error has not been resolved (S113: NO), in S114 the CPU 31 determines whether a wait time until the print job is to be automatically uploaded has elapsed.

With the MFP 100 of the preferred embodiment, there are cases in which errors can be resolved immediately after they have occurred, enabling the MFP 100 to resume printing. By waiting for a prescribed wait time before uploading the print job to ensure that the error has not been resolved, the MFP can reduce the number of jobs that are uploaded to the server 200 and thereby reduce the load on the server 200. This wait time may be a fixed value, or may be a variable value that changes according to user settings and data sizes, for example. If a wait time has not been set, a wait time of zero is used as the default and, hence, the CPU 31 immediately determines in S114 that the wait time has elapsed. When the error is resolved before the wait time elapses (S113: YES), in S131 the CPU 31 resumes the print and returns to S102. The CPU 31 repeatedly performs the determinations in S113 and S114 while the wait time has not elapsed (S114: NO) and the error has not been resolved (S113: NO).

If the wait time elapses before the error is resolved (S114: YES), in S121 the CPU 31 reconstructs the restricted print job. Specifically, the CPU 31 deletes data for pages that have already been printed from the restricted print job and generates a new print job configured of data only for unprinted pages. The new print job is then set as the print job to be uploaded to the server 200 since it is smaller in size and places less load on the server 200 than the original print job uploaded with all pages. S121 is an example of the generation of the new job according to the present invention.

In S122 the CPU 31 appends error data and transfer data to the reconstructed print job. The transfer data may be automatically acquired from print settings or may be acquired by prompting the user for transfer data in S122, for example. When transferring a print job according to the second method described above or when not performing a transfer, transfer data need not be appended to the print job.

In S123 the CPU 31 uploads the print job with appended error data and transfer data to the server 200. S123 is an example of the uploading the job and the error data according to the present invention. In S124 the CPU 31 deletes the print job just uploaded from the MFP 100 and ends the current printing process.

[Process for Saving an Error-Restricted Job on the Server]

Figure 4:
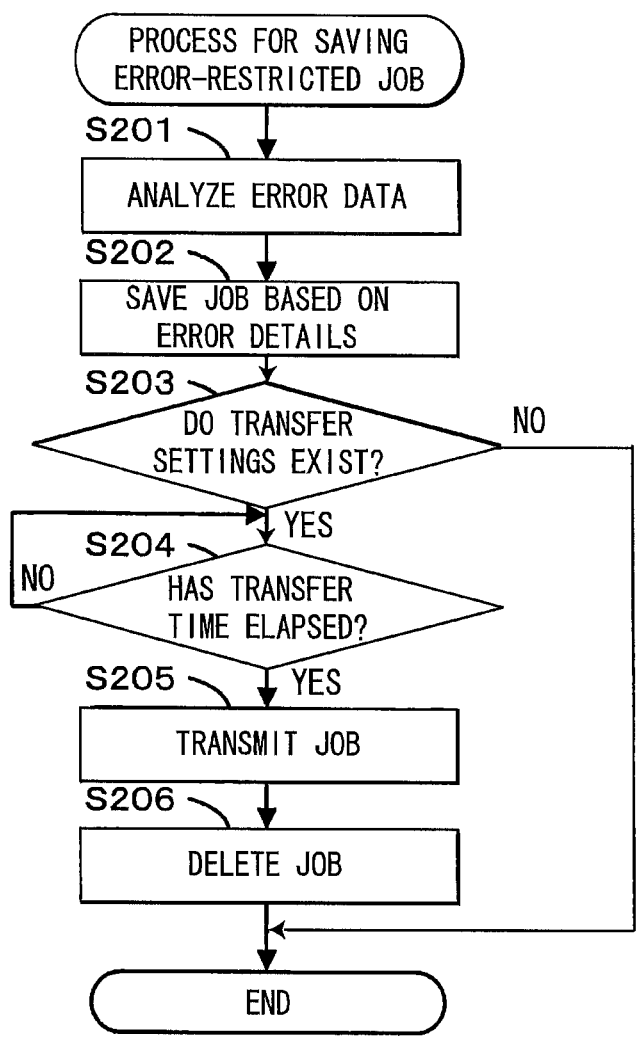
FIG. 4 is a flowchart illustrating steps in a process for saving an error-restricted job executed by the server.

Next a process executed by the server 200 to save a job for which an error occurred (hereinafter called an "error-restricted job") will be described with reference to the flowchart in FIG. 4. The CPU 51 of the server 200 executes the process for saving an error-restricted job upon receiving a print job that includes error data, i.e., a print job transmitted from an MFP in S123 of the printing process described above. The process for saving an error-restricted job is an example of the receiving the job according to the present invention. Further, when the print job also includes transfer data, the process for saving an error-restricted job is an example of the accepting the designation of the printer according to the present invention.

In S201 at the beginning of the process for saving an error-restricted job, the CPU 51 analyzes the error data appended to the print job. In S202 the CPU 51 saves the print job in a folder matching the error details based on the results of the analysis in S201. In other words, the CPU 51 sorts the print job received above based on the error data included with the print job and stores the job at a storage location matching the error details. S202 is an example of the storing the job according to the present invention.

In S203 the CPU 51 determines whether the transfer data indicates a transfer setting for the print job. Here, the CPU 51 gives priority to transfer data included in the print job when such transfer data exists. If the print job does not include transfer data, the CPU 51 acquires transfer data stored on the server 200. If the print job does not include transfer data and transfer data is not stored on the server 200, the CPU 51 determines that there are no transfer settings. Specifically, the CPU 51 determines that there are no transfer settings in the following two cases: (1) when transfer settings cannot be acquired, and (2) when transfer settings exist but indicate that a transfer is not to be performed. When there are no transfer settings (S203: NO), the CPU 51 ends the current process for saving an error-restricted job without transferring the print job from the server 200.

On the other hand, if transfer settings do exist (S203: YES), in S204 the CPU 51 determines whether a transfer time has elapsed. The transfer time may be an absolute time, or may be a relative time such as an elapsed time after the print job was received or saved. If the transfer time has not elapsed (S204: NO), the CPU 51 continues to wait for the transfer time to elapse.

When the transfer time has elapsed (S204: YES), in S205 the CPU 51 transmits the print job to the printer specified as the transfer destination. S205 is an example of the transferring the job according to the present invention. Further, S204 and S205 correspond to the process for implementing the first method described above. After completing the process in S205, in S206 the CPU 51 waits until a notification has been received from the destination printer indicating that the printing process has been completed before deleting the print job transmitted to the printer in S205 from the server 200. Subsequently, the CPU 51 ends the current process for saving an error-restricted job.

In this case, the destination printer receiving the transferred print job initiates a printing operation for printing the job. In this operation, the destination printer prints all remaining pages of the print job that were not printed on the MFP 100 before the job was cancelled.

[Process for Printing a Transferred Job on an MFP]

Figure 5:
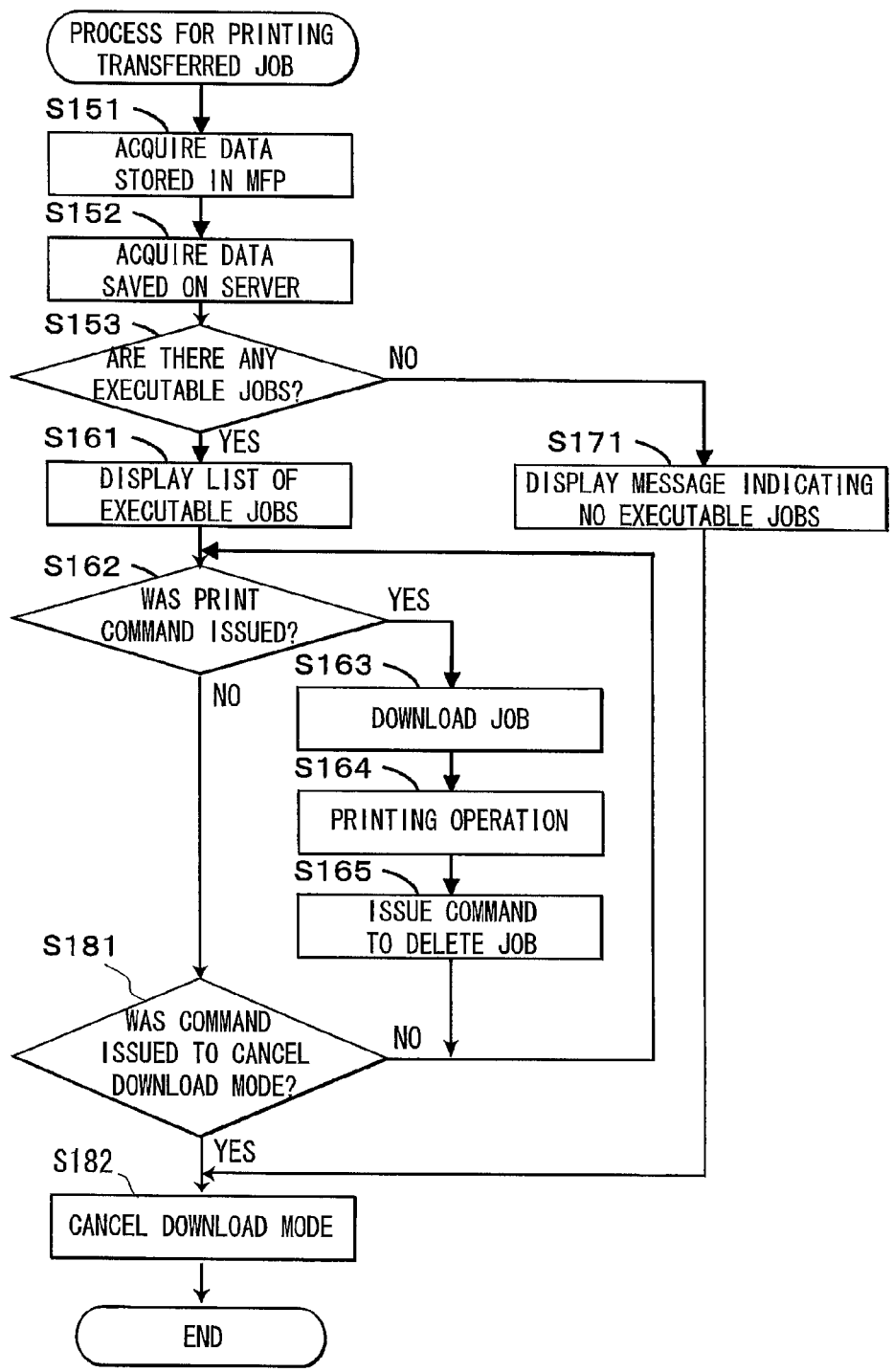
FIG. 5 is a flowchart illustrating steps in a process for printing a transferred job executed by the MFP.

Next, a process executed by the MFP 100 for printing a job transferred from the server 200 will be described with reference to the flowchart in FIG. 5. The CPU 31 executes the process for printing a transferred job when the user performs an operation on the MFP 100 for shifting the MFP 100 into a download mode. The download mode is a mode in which the MFP 100 can download a print job saved on the server 200. Note that this process can also be performed on the MFP 101 and MFP 102.

In S151 at the beginning of the process for printing a transferred job, the CPU 31 acquires data stored on the MFP 100 itself. This data indicates what, if any, types of printing operations the MFP 100 is capable of performing and corresponds to data indicating the sizes of paper loaded in paper trays of the MFP 100 and data for colorants used in printing, for example. In S152 the CPU 31 issues a request to the server 200 to acquire data for print jobs saved on the server 200. Note that the processes in S151 and S152 may be performed in the reverse order or at the same time. S152 is an example of the requesting the jobs according to the present invention.

In S153 the CPU 31 determines based on the data acquired in S151 and S152 whether there are any print jobs saved on the server 200 that the MFP 100 can execute. For example, if a print job is saved in the "A4" folder within the "incorrect paper size" folder on the server 200, the CPU 31 determines that the MFP 100 can execute the print job when the MFP 100 has a paper tray for supplying A4-size sheets. If there are no print jobs saved on the server 200 that the MFP 100 can execute (S153: NO), in S171 the CPU 31 displays a message indicating that there are no executable print jobs. In S182 the CPU 31 cancels the download mode, and subsequently ends that process for printing a transferred job.

However, if there is a print job that the MFP 100 can execute (S153: YES), in S161 the CPU 31 displays a list of executable print jobs on the operating panel 40 and accepts a user selection for one of the displayed print jobs. S161 is an example of the accepting the execution command according to the present invention.

In S162 the CPU 31 determines whether a print command was issued while a print job was selected. If a print command was issued (S162: YES), in S163 the CPU 31 outputs a request to the server 200 to download the selected print job, and begins downloading the print job from the server 200. In S164 the CPU 31 initiates a printing operation based on the downloaded print job. In S165 the CPU 31 waits for the printing operation to be completed and, once the job is completed, issues a command to the server 200 to delete the print job downloaded in S163. Subsequently, the CPU 31 returns to S162 and waits for the next print command.

If a print command is not issued in S162 (S162: NO), in S181 the CPU 31 determines whether a command was issued to cancel the download mode. If a command was not issued to cancel the download mode (S181: NO), the CPU 31 returns to S162 and repeats the determinations in S162 and S181. If a command was issued to cancel the download mode (S181: YES), in S182 the CPU 31 cancels the download mode, and subsequently ends the process for printing a transferred job.

In the printing system 900 of the preferred embodiment above, when an error occurs on the MFP 100 while the MFP 100 is executing a print job, the MFP 100 uploads error data identifying details of the error to the server 200 in addition to the print job for which the error occurred. Upon receiving this data, the server 200 stores the print job on the HDD 54 in association with the error data. Consequently, the user can easily infer what type of error occurred for any print job by viewing the print job stored on the server 200 using software or the like that is capable of displaying the structure of the storage location for the print job.

While the invention has been described in detail with reference to specific embodiments thereof, it would be apparent to those skilled in the art that many modifications and variations may be made therein without departing from the spirit of the invention, the scope of which is defined by the attached claims. For example, instead of the MFP 100, the printer connected to the server 200 may be any device having a printing function, such as a copy machine, printer, or facsimile machine.

In the embodiment described above, the MFP 100 executes a printing process, and the MFPs 101 and 102 execute the process for printing a transferred job in order to print a print job according to the second method. However, since each MFP is capable of executing both the printing process and the process for printing a transferred job, the MFP 100 can also execute print jobs that are uploaded by the MFPs 101 and 102. Further, if an error occurring on the MFP 100 while the MFP 100 is printing a job is subsequently resolved after the MFP 100 uploaded the print job to the server 200, the MFP 100 itself may download the same print job and repeat the printing process for this print job.

Although the MFP 100 of the preferred embodiment reconstructs a print job for which printing has been restricted to produce a print job with only the unprinted portion of the job before uploading the print job, this reconstruction may be omitted. By not reconstructing the print job, the destination printer can reprint the entire job from the beginning. Thus, if the destination printer has a different printing quality from the printer on which the error occurred, for example, reprinting from the start ensures uniform printing quality on all pages of the print job.

The method of the preferred embodiment for storing a print job in association with error data involves generating a folder for each error type and saving the print job and related error data in the appropriate folder, but errors may be sorted using a database such as a registry, for example.

In the preferred embodiment, there are two possible methods for having print job X saved on the server 200 printed on another printer, but the printing system 900 may be limited to executing only one of these methods instead. Further, the MFP 100 itself may wait a prescribed time for the error to be resolved without transferring the print job to the server 200. In other words, even if the MFP 100 does not have a function for transferring print jobs to the server 200, the MFP 100 can still facilitate the user in confirming details of the error that occurred, provided that the MFP 100 has a function for saving the print job on the server 200 in association with error data.

The processes described in the embodiment may be executed by a single CPU, a plurality of CPUs, hardware such as an ASIC, or a combination of these components. Further, the processes described in the embodiment may be implemented according to various methods and using any of various storage media for storing programs used to execute the processes.

What is claimed is:

1. A printer comprising:
   a communication unit configured to communicate with a server;
   a printing unit; and
   a control unit configured to:
   receive a job from the server;
   control the printing unit to execute the job;
   terminate execution of the job upon detecting an error when the printing unit is executing the job;
   determine whether it is necessary to upload the terminated job to the sever; and
   when the control unit determines that it is necessary to upload the terminated job to the sever, upload the job to the server via the communication unit and send error data indicating details of the error to the server via the communication unit.

2. The printer according to claim 1, wherein the control unit is configured to terminate the execution of the job and upload the job, send the error data when the error has interrupted the execution of the job by the printing unit.

3. The printer according to claim 1, wherein, when the error is detected before the execution of the job is completed, the control unit is configured to generate a new job configured of data only for unprinted pages and upload the new job to the server.

4. The printer according to claim 1, wherein the control unit is configured to upload the job when a wait time is elapsed after the detection of the error; and
   wherein the control unit is configured not to upload the job when the error is resolved before the wait time is elapsed.

5. A server comprising:
   a communication unit configured to communicate with a printer;
   a storage unit; and
   a control unit configured to:
   receive a job and error data from the printer via the communication unit, the error data indicating details of an error that has occurred when the printer is executing the job, the details including one of a plurality of types of error data;
   sort the job based on the type of error data; and
   store the job with the error data at a storage location matching the type of error data in the storage unit.

6. The server according to claim 5, wherein the control unit is configured to store the job when the error has interrupted execution of the job by the printer.

7. The server according to claim 5, wherein the storage location is a folder having a name matching the type of error data and the control unit is configured to display the folder name.

8. The server according to claim 5, wherein the error data includes at least one of data indicating a size of paper and data indicating color of colorants used in executing the job.

9. The server according to claim 5, wherein the communication unit is configured to communicate with a plurality of printers; and
   wherein the control unit is further configured to:
   accept a designation of a printer selected from the plurality of printers for executing the job and a designation of a transfer time at which the job is transferred to the designated printer; and
   transfer the job stored in the storage unit to the designated printer upon elapse of the transfer time.

10. A printing system comprising: a server; and a printer, wherein the printer comprises:
   a printer communication unit configured to communicate with the server;
   a printing unit; and
   a printer control unit configured to:
   control the printing unit to execute a job;
   terminate execution of the job upon detecting an error when the printing unit is executing the job; and upload the job and error data to the server via the printer communication unit, the error data indicating details of the error that has occurred when the printer is executing the job, the details including one of a plurality of types of error data; and wherein the server comprises:
  a communication unit configured to communicate with a printer;
  a storage unit; and
  a control unit configured to:
  receive the job and error data from the printer via the communication unit;
  sort the job based on the type of error data; and
  store the job with the error data at a storage location matching the type of error data in the storage unit.

\* \* \* \* \*